June 25, 1935.    A. L. MILLER ET AL    2,005,870
BRAKE GAUGING DEVICE
Filed June 20, 1932    2 Sheets-Sheet 2
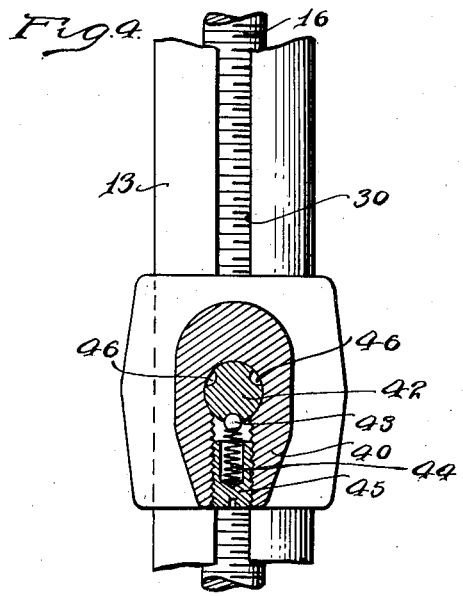
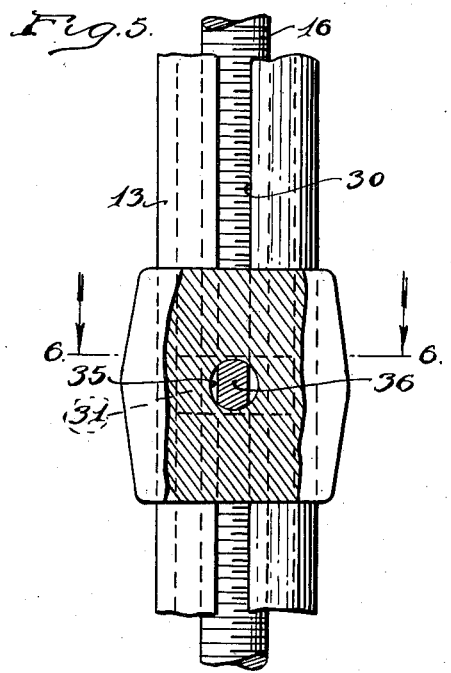
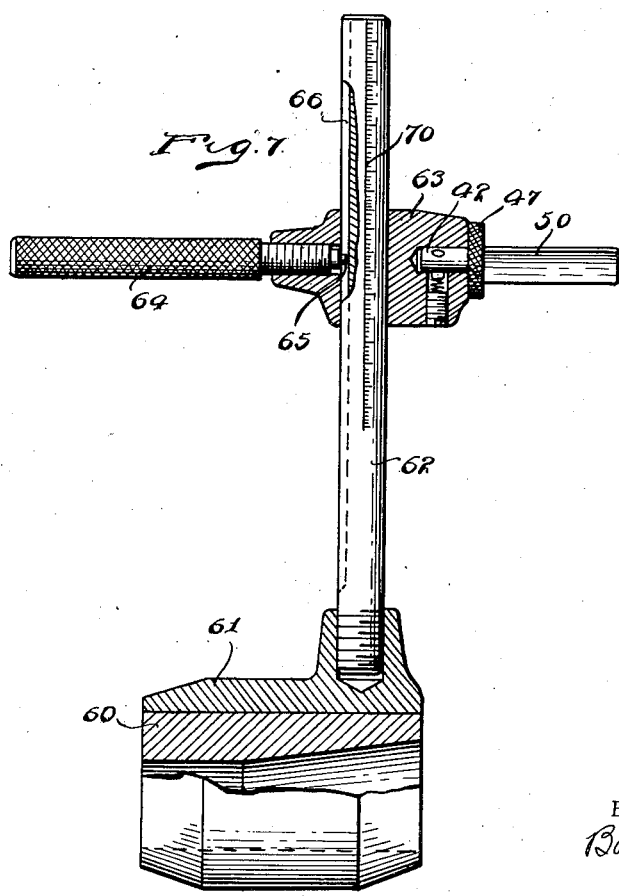
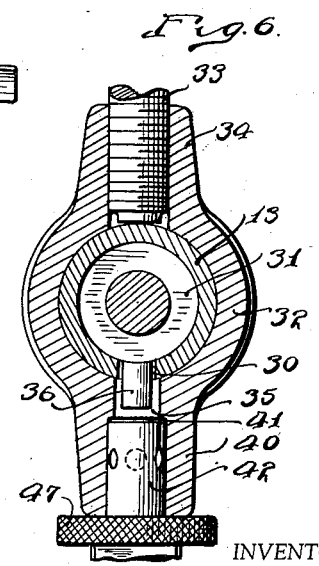
INVENTORS
ALVIN L. MILLER.
RUSSELL H. MILLER.
BY
Barnes, Kisselle + Laughlin
ATTORNEYS.

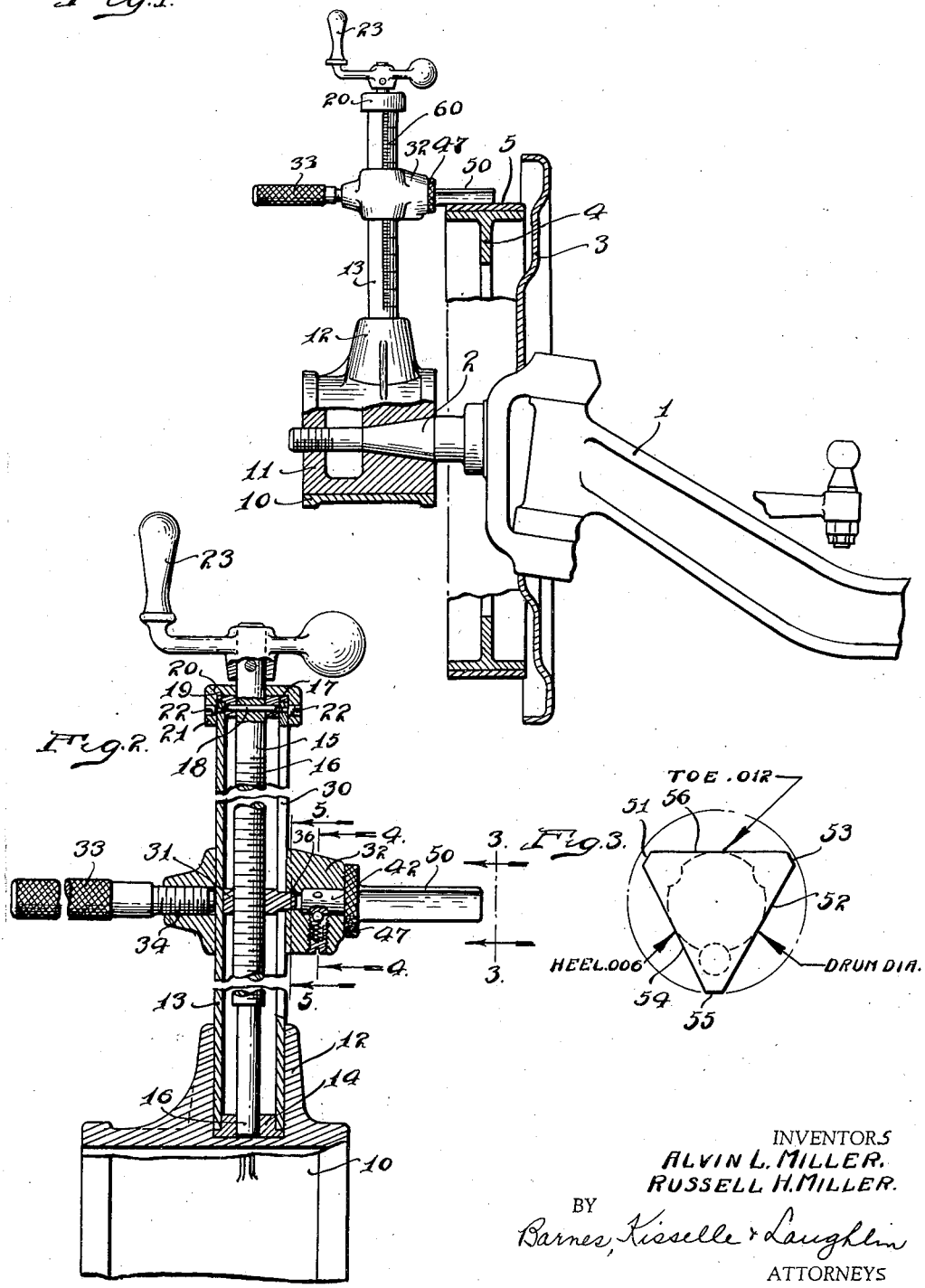

Patented June 25, 1935

2,005,870

UNITED STATES PATENT OFFICE 2,005,870

BRAKE GAUGING DEVICE

Alvin L. Miller and Russell H. Miller, Detroit, Mich.

Application June 20, 1932, Serial No. 618,114

5 Claims. (Cl. 33—180)

This invention relates to a gauging device useful for initial installation, relining, adjusting or otherwise manipulating the brakes of vehicles. The device is particularly one designed for use with brakes of automotive vehicles.

Many brakes in use today have expanding shoes equipped with brake lining or friction material adapted to frictionally engage the inner surface of a brake drum. Such a brake structure is shown herein as one with which the present tool may be used. The object of the invention is to provide a gauging tool for quickly and accurately effecting proper adjustment of brake shoes. In some brakes different portions of the shoes are adjusted for different normal clearances as regards the brake drum; as for example, one end of the shoe termed the "heel" may be adjusted for clearance as regards the brake drum, less than the clearance at the other end of the brake shoe called the "toe". This is usually true of hydraulic brakes. The clearances may vary with the brake design and the tool may be arranged for use with as many different brake variations as may occur.

The principal objects of the invention reside in the provision of a tool structure adapted to be journaled upon the axis of a wheel whether it be a spindle or the end of a driving shaft. The tool is of a relatively simple rugged structure capable of taking close adjustment and provided with a gauging element which is shiftable and which has a plurality of gauging surfaces in order to gauge different portions of the brake shoe which are set for different clearances as regards the drum, with one major adjustment of the tool. In other words, for a given brake job the tool may be properly adjusted as regards the diameter of the braking surface of the drum, and then this adjustment may be maintained and the different portions of the brake shoe properly gauged by the shiftable gauging element.

In the accompanying drawings:

Fig. 1 is a view partly in elevation and partly in section showing a tool constructed in accordance with the invention mounted upon the wheel spindle of a front axle of an automotive vehicle.

Fig. 2 is a sectional view taken through the tool.

Fig. 3 is an end view illustrating the gauging element and diagrammatically illustrating the relation of the gauging surfaces thereof, looking on line 3—3 of Fig. 2.

Fig. 4 is an enlarged sectional view taken substantially on line 4—4 of Fig. 2.

Fig. 5 is an enlarged sectional view taken substantially on line 5—5 of Fig. 2.

Fig. 6 is a sectional view taken on line 6—6 of Fig. 5.

Fig. 7 is a view partly in section and with parts cut away illustrating a modified arrangement of the tool.

The front axle of an automotive vehicle is illustrated at 1, the same having a wheel spindle 2; the back plate of a brake is illustrated at 3, and a brake shoe is illustrated at 4 having a brake lining 5.

The tool may comprise a hub element 10 designed to be swiveled upon the spindle 2, and this may be accomplished through the means of a suitable adaptor bushing 11. A given tool may be supplied with a number of adaptor bushings in order to take care of various sized spindles, or an adaptor bushing such as shown in application Serial No. 436,510, filed on March 17, 1930, which is adjustable, may be used. Obviously, the tool may be mounted on the end of a live axle as well as on a spindle.

The hub element may have a boss 12 which is cored out for receiving a member advantageously of tubular form, as shown at 13, which is securely fastened into the boss 12 as by means of a press fit or the like. A journal-forming member 14 may be disposed at the end of the tube within the boss 12. A rod member 15 may extend into the tube and its inner end, as at 16, may be journaled in the member 14. This member preferably is provided with screw threads, as at 16, and projects through the end of the tube. An enlargement 17 is on the rod 15 and it may be in the form of a washer secured to the rod by a pin 18, or it may be integral therewith, and this member may have a flange 19 extending over the end of the tube. A collar 20 may be placed over the end of the rod and it may have a flange 21 fitting over the tube and the same may be fixed to the end of the tube by set screws 22. This serves to hold the rod in place and prevent it from removal from the tube. A suitable handle, such as illustrated at 23, may be secured to the end of the rod so that it may be turned. The inner end may be journaled in the member 14 whereas the enlarged portion or washer portion 17 may turn with respect to the end of the tube remote from the hub.

The tube is preferably provided with a lengthwise extending slot 30, and a plunger-like element or follower 31 with internal screw threads fits within the tube and is arranged to be shifted therein by the turning of the screw threaded rod.

A shiftable gauge-supporting block 32 may be sleeved over the tube 13; a handle 33 may be screw threaded into a boss 34 and designed to be tightly engaged against the tube to hold the block from shifting. The block may have an aperture 35 for receiving a protecting stud or finger 36 on the collar 31, this stud extending through the slot 30 in the tube 13. Accordingly, it will be noted that by turning the rod 15 the plunger 31 may be shifted in the tube, the same being held against rotation by reason of the stud 36 projecting through the slot in the tube, and the stud 36 due to its engagement with the block 32, may shift the block lengthwise in the tube. Thus, the block may be adjusted and a given adjustment may be maintained by screwing the handle 33 down tightly against the tube.

The block 32 may have a boss 40 provided with a recess 41 for rotatably receiving the projecting part 42 of a gauging element. The boss 40 may likewise contain a ball 43 backed up by a spring 44 which is held by a plug 45, and this ball is designed to act as a detent when fitting into one of a number of recesses 46 in the portion 42 of the gauging element. Accordingly, it will be noted that the gauging element may be turned and held in one of a number of positions by the ball detent. The turning of the gauging element may be accomplished through the means of an enlarged portion which may be knurled, as shown at 47. The gauging part per se projects from the knurled part 47 and is generally referenced 50. In the present instance this gauging element is triangular in form, as best illustrated in Fig. 3, with gauging surfaces provided by the apices of the triangle. It has one gauging surface 51 designed to be adjusted to the drum diameter, and the opposite face 52 may carry indicia indicating the same, as for example, "Drum dia". It has a gauging surface 53 for gauging the heel of a brake shoe and the opposite face may carry indicia "Heel .006". It has a gauging surface 55 for the toe, and the opposite surface 56 may carry suitable indicia, such as for example "Toe .012". The particular dimensions given are for a tool for adjusting a brake where the heel has a .006 of an inch clearance as regards the brake drum, and the toe a .012 clearance as regards the brake drum.

In using the tool the diameter of the brake drum may be first determined and the gauging instrument 50 may be turned to position the surface 51 inwardly towards the axis. Then the tool may be adjusted so that the surface 51 is properly positioned to indicate the drum diameter. In adjusting the shoe, the tool may be turned to position the surface 53 innnermost for gauging the heel, and the surface 51 innermost for gauging the toe of the brake shoe. When a given gauging surface is innermost for gauging purposes the opposite face is disposed upwardly and the indicia is readable. It is within the invention to provide a gauging tool such as the tool 50 with a less number or greater number of gauging surfaces depending upon the requirements of the brakes to be handled. And likewise, the gauging surfaces may be so positioned as to provide the proper clearances. The tube 13 may be equipped with indicia as at 60, if the same is desired.

A modified tool arrangement is shown in Fig. 7. In this form, the tool comprises a hub element 61 designed to be mounted upon an adaptor bushing or the like 60, and the body of the tool may comprise a rod 62 secured to the hub element 61 as by means of screw threads and projecting radially therefrom. A supporting block 63 is reciprocable upon the member 62, and a screw threaded handle 64 is designed to be loosened and designed to permit shifting of the block 63 and for holding it in position. The handle may have a projecting teat 65 which may operate in a slot or groove 66 to prevent the block 63 from swiveling on the member 62. The gauging tool may be identical with the one heretofore described, and the reference characters applied to the other gauging tool are applied to the gauge in the form shown in Fig. 7. The rod 62 may be equipped with suitable indicia 70 for indicating the distance from the axial center of the hub of the gauging surfaces of the member 50. In this form of tool the body member is of cheaper construction and is not capable of so fine adjustment as is the tool previously described. However, after an initial adjustment is made for a brake drum diameter, the gauging element 50 provides the gauging surfaces with different positions for different portions of the brake shoes in an accurate manner.

We claim:

1. A brake gauging tool comprising a hub member adapted to be rotatably mounted upon a wheel spindle or axle shaft, a radially disposed tube fixed to the hub, an apertured washer at the inner end of the tube, a screw threaded rod on the axial center of the tube the inner end of which is journaled in the washer, a collar journaling the rod at the outer end of the tube, an inverted cup shaped collar through which the rod extends and fitted over the outer end of the tube, means securing the collar to the tube and serving to hold the rod against axial movement in the tube, a handle for rotating the rod, a follower on the threads of the rod, said tube having a longitudinally extending slot therein, a projection on the follower extending through the slot, an apertured block fitting over the tube and having an aperture for receiving the projection of the follower, means in the block for receiving and holding a brake gauging element, and a handle screw threaded into the block and adapted to be abutted against the tube to hold the block against movement.

2. A brake gauging tool comprising a hub element adapted to be rotatably mounted upon an axle spindle or shaft, a member extending radially outwardly therefrom, a device for supporting a gauge element carried by the member, means for shifting the device on the member radially of the hub element, a gauging element having an end portion journaled in the device and having a projecting gauging portion polygonal in cross sectional shape, the corners of the polygon being disposed different distances from the axial center of the hub element and from the axis upon which the gauging element is journaled and constituting each a relatively long narrow gauging surface, and detent means for holding the gauging element in position for the use of any one of the said corners as a gauging surface.

3. A brake gauging tool comprising a hub element adapted to be rotatably mounted upon an axle spindle or shaft, a member extending radially outwardly therefrom, a device for supporting a gauge element carried by the member, rotary means for shifting the device on the member radially of the hub element, a gauging element having an end portion journaled in the device and having a projecting gauging portion polygonal in cross sectional shape, the corners of the polygon being substantially flat and disposed different distances from the axial center of the hub element and different distances from the axis upon which the gauging element is journaled and constituting each a relatively long narrow gauging surface, and detent means for holding the gauging element in position for the use of any one of the said corners as a gauging surface.

4. A tool for gauging vehicle brakes comprising in combination a hub element adapted to be rotatably mounted on a wheel spindle or shaft, a rod member fastened to the hub element and projecting radially outwardly therefrom, a supporting body slidable on said rod member, means for holding the supporting member against rotary movement on the rod member, a handle member screw threaded into the supporting member for clamping against the rod member to hold the supporting member in adjusted position on the rod member, said supporting body having a recess therein, a gauge member having a round end portion journaled in said recess, substantially the remaining portion of the gauge member being polygonal in cross section and projecting away from the supporting member and having a free end, detent means acting upon the gauge member to permit of its rotation in the recess and to hold it positioned, the corners of the polygonal shape consituting each a relatively long narrow gauging surface and being located different distances from the axes of the hub element and from the axis of the journaled round end for gauging different portions of a brake structure.

5. A tool for gauging vehicle brakes comprising in combination a hub adapted to be rotatably mounted upon a wheel spindle or shaft, an arm extending radially outwardly from the hub, a supporting member carried by the arm and adjustable lengthwise thereof, gauging means for the supporting member, a gauging element having a minor portion at one end journaled in the supporting member, said gauging element having a major portion of polygonal shape in cross section and projecting away from the supporting member and adapted to overlie the brake structure and having a free end, detent means for controlling the rotary movements of the gauging element in its journal mounting in the supporting member, the corners of the polygonal shape of the major portion having substantially flat surfaces and constituting each a relatively long narrow gauging surface, and the gauging surfaces of the corners being located at varying distances radially from the axial center of the minor portion of the element and from the axis of the said hub whereby the different gauging surfaces may gauge different elements of a brake structure.

ALVIN L. MILLER.
RUSSELL H. MILLER.